United States Patent

[11] 3,596,537

[72] Inventor Erkki A. Koivunen
Livonia, Mich.
[21] Appl. No. 832,168
[22] Filed June 11, 1969
[45] Patented Aug. 3, 1971
[73] Assignee General Motors Corporation
Detroit, Mich.

[54] CLUTCH PISTON AND RETRACTION SPRING SUBASSEMBLY AND METHOD OF TRANSMISSION ASSEMBLY
16 Claims, 3 Drawing Figs.

[52] U.S. Cl. .................................................. 74/759,
192/85, 188/72.4, 74/750
[51] Int. Cl. .................................................. F16h 15/56,
F16d 55/10, F16d 25/06
[50] Field of Search ........................................ 74/759;
29/429; 188/71.5, 72.4; 192/85

[56] References Cited
UNITED STATES PATENTS
2,880,834 4/1959 Gerst .......................... 192/85
3,035,871 5/1962 Giampapa et al. ............ 188/72.4 X
3,063,529 11/1962 Cook ........................... 192/87.11 X
3,260,331 7/1966 Borman, Jr. .................. 188/72.4
3,263,526 8/1966 Stockton ..................... 74/759 X
3,279,573 10/1966 Hensel ......................... 192/87.11
3,353,641 11/1967 Chana .......................... 192/85
3,490,312 1/1970 Seitz et al. ................... 192/85

Primary Examiner—Arthur T. McKeon
Attorneys—E. W. Christen and A. M. Heiter

ABSTRACT: This transmission has multiratio drive planetary gearing and a plurality of fluid actuators for selectively engaging a plurality of friction devices to engage the ratio drives. A central web splined to the transmission housing has oppositely facing fluid actuators each having an annular piston in a cylinder. Each piston has an inner annular engagement seat and an outer interrupted annular engagement seat for engaging the brake plates with retraction springs and fastener posts located between the seats. A retainer plate has an annular portion between the seats engaging the springs, an aperture for receiving the fastener posts and ear portions extending into engagement with the web. Snap rings hold the retainer plates and web against axial movement. A fastener on each fastener post holds the retainer plate, piston and springs in assembled position for assembly into the cylinder of the transmission.

INVENTOR.
Erkki A. Koivunen
BY
A. M. Heiter
ATTORNEY

CLUTCH PISTON AND RETRACTION SPRING SUBASSEMBLY AND METHOD OF TRANSMISSION ASSEMBLY

This invention relates to transmissions and particularly to an improved fluid actuated ratio establishing friction device and bearing support structure for gearing providing simplified assembly and an improved method of assembly.

Transmission constructions which require assembly of many complex parts on different splines, the use of many snap rings and the compression of the retraction springs for the pistons of the fluid actuators during assembly of the transmission parts in the housing present a difficult and expensive assembly operation.

Transmissions, in addition to meeting the drive requirements of the vehicle in which they are used, should have a simple structural support arrangement which can be easily assembled to insure uniform assembly for reliability and reduction of initial and repair costs. In accordance with this invention the number and complexity of the parts is reduced, particularly the number of snap rings and the fluid actuator devices and their retraction springs are preassembled with the springs compressed to facilitate transmission assembly.

The object of the invention is to provide an improved transmission to facilitate and simplify assembly.

Another object of this invention is to provide a fluid actuator preassembly having a movable actuator member with a retainer member secured to said movable actuator member only to prevent separating movement to hold the retraction springs between these members and permit apply movement in the final assembly.

Another object of the invention is to provide an improved fluid actuator in which the piston is located in the cylinder and retraction springs are precompressed between the piston and the retraction plate which is secured to the piston by a fastener to hold the retraction springs compressed but which permits apply movement during fluid operation of the fluid actuator.

Another object of the invention is to provide an improved method of assembling a transmission in which the retraction springs are placed on the movable actuator member and a retainer plate is attached to the movable actuator member to prevent only separating movement to hold the springs in position to provide a preassembly for positioning a fixed actuator member.

Another object of this invention is to provide improved fluid actuator and friction device components of a transmission to facilitate assembly into a transmission housing.

These and other objects and advantages will be apparent to those skilled in the art from the following description and drawings.

FIG. 1 shows a partial cross section of the transmission gearing and fluid actuated friction devices.

FIG. 2 is a section on line 2-2 of FIG. 1 showing details of the fluid actuator.

FIG. 3 is an exploded view of the fluid actuator.

Figure 1:
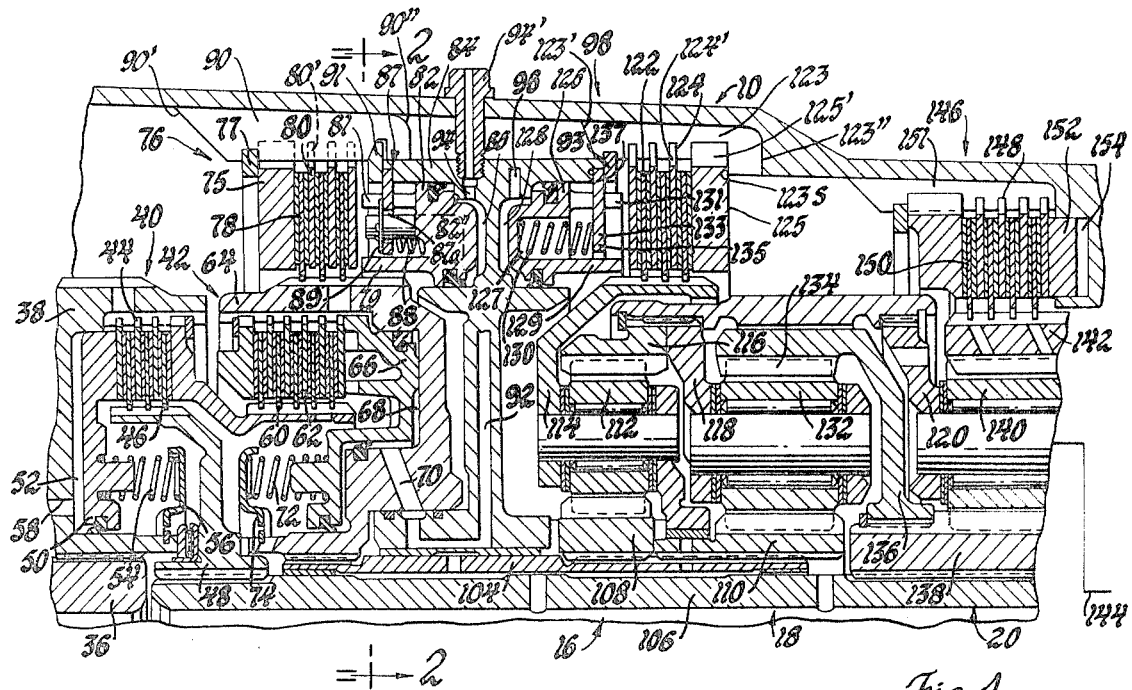
Referring to FIG. 1, there is a transmission having a housing 10 which enclosed a torque converter, a hydraulic pump not shown but fully described in application Ser. No. 805,190 Power Transmission, filed Mar. 7, 1969 by John J. O'Malley and showing three planetary gear sets 16, 18 and 20.

A torque converter of conventional construction transmits power from the engine to the transmission gearing through input shaft 36 splined to a clutch housing 38. The clutch housing 38 is drivingly connected to two input clutches 40 and 42.

The input clutch 40 includes a plurality of alternately spaced plates 44 and 46 which are splined to the clutch housing 38 and a hub 48 respectively. A piston 50 is slidably mounted in a fluid chamber 52 in the clutch housing 38. The fluid pressure in chamber 52 urges the piston 50 to engage the clutch plates 44 and 46 to the clutch 40. The return spring 54 is held in compression between the piston 50 and a spring retainer 56 which is mounted on the housing 38. The return spring 54 moves the piston 50 out of engagement with the clutch plate when the chamber 52 is not pressurized. A passage 58 in the housing 38 is adapted to supply fluid to the chamber 52.

The clutch 42 includes a plurality of alternately spaced plates 60 and 62 which are splined to the clutch housing 38 and to a drum 64 respectively. A position 66 is slidably mounted in chamber 68 in drum 64. The chamber is pressurized to engage the clutch 42. A passage 70 in drum 64 conveys fluid pressure to chamber 68. A return spring 72 is compressed between the piston 66 and a spring retainer 74 mounted on drum 64 and functions to move the piston out of engagement when the chamber 68 is not pressurized. A brake 76 is also operatively connected with the drum 64 and includes alternately spaced plates 78 splined to the drum 64 and plates 80 having four or more sets of spaced pairs of teeth 80' extending from the outer perimeter which fit in four or more spaced pairs of spline recesses 90. The splines 90 are axially short and only extend from 90' to 90", the length of the clutch plates 78—80, snap ring 91, backing plate 75 and snap ring 77, so the case may be cast with a one piece core and axially drawn. The draft in these short splines does not provide excessive clearance at the thin or front ends. The web 84 is rotatably fixed by fittings, such as fitting 94' for line 94 and axially located between snap rings 91 and 93 in grooves in the transmission housing 10. The fitting 94' is shown at the top of the housing for convenience but is usually at the bottom adjacent the valve body not shown. A piston or movable actuator member 82 is slidably mounted in the annular chamber or cylinder 86 having annular sidewalls and a transverse wall formed in the central web 84. When chamber 86 in the fixed actuator or web is filled with pressure fluid piston 82 moves to engage the brake 76.

The plates of brake 76 are located between the fixed backing or abutment plate 75 located by snap ring 77 in a groove in splines 90 and housing 10 and the annular actuator apply face on inner actuator annulus 79 and the interrupted annular face or outer actuator annulus 81 both on piston 82. The outer actuator annulus 81 has gaps therein for ears 87" of retainer plate 87. Fastener posts 83 are fixed or integral with the transverse wall of the piston or movable actuator between the annuluses providing the apply faces. The transverse wall has a fluid confining face facing in the direction into the cylinder.

A plurality of coil return springs 88 seated in round pockets 85 between annuluses 79 and 81 engage the annular spring retainer plate 87 which is fixed in a groove 84' in the fixed actuator or central web 84 and retained therein by wedge snap ring 91 to bias the piston out of engagement with the plates 78 and 80 when the brake is disengaged. Note that retainer plate 87 has an annular portion 87' between the inner and outer actuator annuluses 79 and 81 engaged by the springs 88 and anchoring ear portions 87" extending through the interruptions or gaps between the parts of the interrupted annular outer actuator portion to seat in the groove 84' in web 84. Openings or holes 87a in the retainer plate 87 fit over posts 83 to guide and locate the retainer plate with respect to the piston 82.

The friction fastener 89 slips on the post 83 and holds the piston 82 and retainer plate 87 at a fixed maximum distance apart with the retraction springs 88 preferably partially compressed and almost in the fully retracted position. This subassembly remains as assembled during transmission assembly and disassembly. When the transmission is assembled as pointed out below the wedge snap ring 91 moves the retainer plate 87 sufficiently to relieve the spring load on fastener 89. The springs and posts are symmetrically distributed about the annulus to provide a balanced retraction force and load on the attachable fastener means, post 83 and fastener 89.

The central web 84 is rotatably secured to the transmission housing by fittings, i.e. fitting 94' and has a plurality of fluid passages 92, 94 and 96 which are adaptive to supply pressure to the clutch 42, the brake 76 and brake 98 respectively as shown in detail in the above Ser. No. 805,190.

Figure 2:
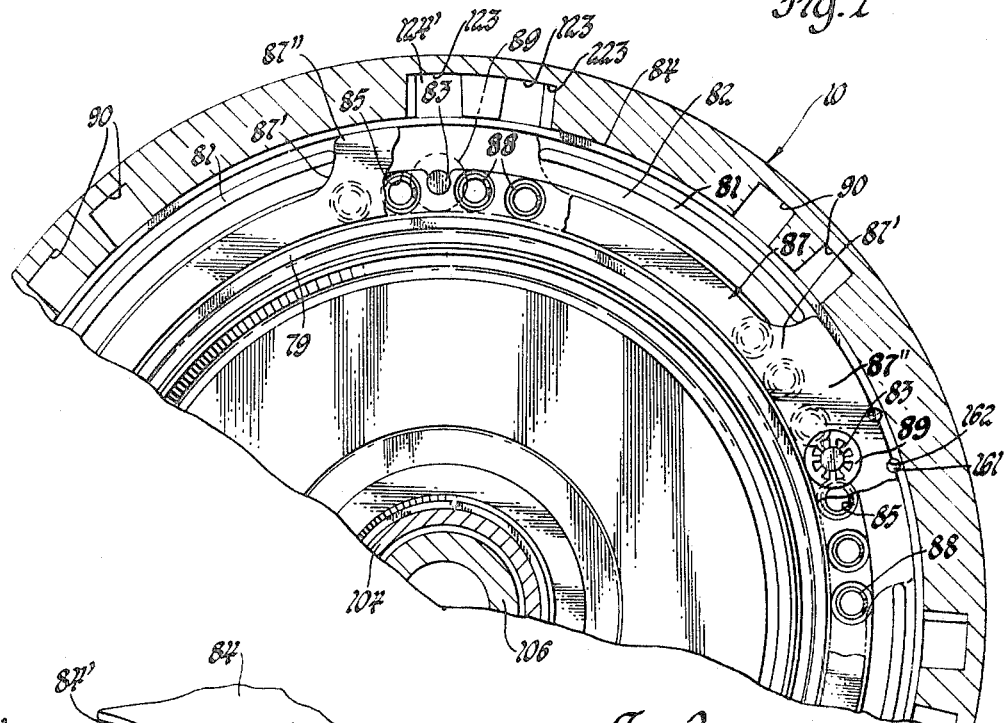
Figure 3:
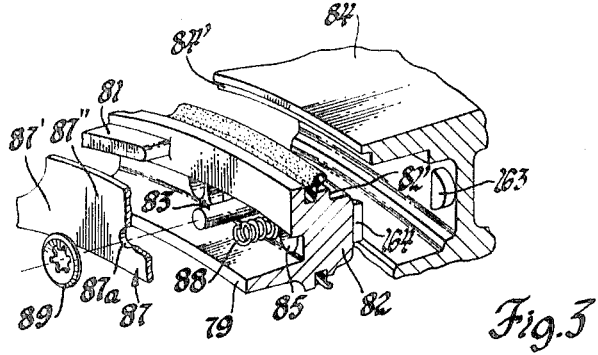

Brake 98 has plates 122—124 abutting the fixed abutment plate 125 which is axially positioned by the step 123S in spline recess 123. The plates 124 have a plurality of pairs of ears 124' and the abutment plate 125 has similar ears 125' which fit in the spline recesses 123 arranged in a plurality of pairs about the perimeter. The short spline 123 from end 123' to end 123'' has minimum draft to avoid excessive clearance in the forward splines. As shown in FIG. 2 a clearance recess 223 extends forwardly in the housing between spline recesses 90 so the rear plates can be assembled from the open front of the transmission housing and so this long recess can have maximum draft. This access recess is generally wider than both spline recesses. Thus web 84 is piloted by the cylindrical internal diameter of the housing which is only interrupted by recesses 223.

Piston 126 is like piston 82 with springs 130 seated in round holes or seating pockets 127 between the inner engagement seat 129 and the outer interrupted annular engagement seat 131. The annular retainer 133 has an annular portion 135 engaging springs 130 and ears 137 extending between the portions of the interrupted engagement seat 131 into a groove in web 84 and retained therein by snap ring 93. As in piston 82, piston 126 has a fastener post between each group of retainer springs extending through an opening in the annular portion of the retainer ring and a fastener to hold the retainer plate and springs in assembled position. The web 84 also provides rotational support for an intermediate sleeve shaft 104 which is splined to the drum 64 and for an intermediate shaft 106 which is splined to the hub 48 and rotatably journaled in the sleeve shaft 104.

The sleeve shaft 104 is splined to a pair of sun gears 108 and 110 which are components of the planetary gear sets 16 and 18 respectively. The planetary gear set 16 also includes a plurality of planet pinions 112 which are rotatably mounted in a carrier 114 and mesh with the sun gear 108 and a ring gear 116 which is drivingly connected to a carrier 118 of the planetary gear set 18 and a carrier 129 which is a member of the planetary gear set 20. The carrier 114 is operatively connected to the brake 98 which includes the plurality of alternately spaced plates 122 and 124 which are splined to the carrier 114 and the housing 10 respectively. The piston 126 is slidably mounted in annular cylinder or chamber 128 in the central web 84. The chamber 128 is filled with pressure fluid via passage 96 to engage the brake 98. A plurality of return springs 130 are provided to move the piston 126 out of engagement with the brake plates 122—124 to disengage the brake 98 when the chamber 128 is not pressurized.

The planetary set 18 includes a plurality of pinion gears 132 which are rotatably mounted on the carrier 118 and mesh with the sun gear 110 and a ring gear 134 which is drivingly connected through a hub 136 with a sun gear 138 of the planetary set 20. The ring gear 134 and the sun gear 138 are splined to the intermediate shaft 106 which is connected to the input clutch 40.

The planetary set 20 also includes a plurality of pinion gears 140 which are rotatably mounted on the carrier 120 and mesh with the sun gear 138 and a ring gear 142. The carrier 120, the carrier 118 and the ring gear 116 are drivingly connected to the transmission output shaft 144. The ring gear 142 is operatively connected to a brake 146 which includes a plurality of alternately spaced plates 148 and 150 which are splined to splines 151 in the transmission housing 10 and the ring gear 142 respectively. The splines 151 are cast axially draftable splines at a smaller diameter than splines 90 and so the housing is an axially draftable casting. A piston 152 is slidably disposed in chamber 154 in the transmission housing 10. When apply chamber 154 is filled with pressure fluid, the piston 152 engages the plates 148—150 thereby applying the brake 146. A plurality of return springs (not shown) are provided to move the piston 152 out of engagement with the brake plates when the chamber 154 is not pressurized.

Rotation of pistons 84 and 126 may be prevented by pins 161 set in bores in web 84 and fitting recesses 162 in ears 87'' of spring retainer 87 which engages the piston 82 at the edge of ears 87'' fitting in the gaps between the portions of interrupted actuator annulus 81 or at the aperture 87a for post 83. Also half circular abutments 163 and 164 or an abutment and fitting recess on the web 84 and piston 82 may prevent rotation of the piston.

The clutches and brakes described above are actuated by fluid pressure in the manner described in the above Ser. No. 805,190.

The clutch 40, when engaged, provides a drive connection from the torque converter or input to the sun gear 138 and ring gear 134. The clutch 42, when engaged, provides a drive connection from the torque converter or input to the sun gears 108 and 110. The brake 76, when engaged, restrains the sun gears 108 and 110 from rotation to thereby establish sun gear 110 as a reaction member. Brake 98 restrains carrier 114 from rotation and thereby establishes the carrier as a reaction member. The brake 146 restrains the ring gear 142 from rotation and thereby establishes the ring gear as a reaction member. To provide first gear drive forward, the clutch 40 and the brake 146 are engaged thus providing a simple planetary reduction in the planetary gear set 20.

To establish second gear forward, the brake 146 is disengaged while the brake 98 is engaged and the clutch 40 remains engaged to provide a compound reduction drive in planetary gear sets 18 and 16 between the input shaft 34 and the output shaft 144. In second gear forward, the ring gear 134 is the input member for the planetary gearing and ring gear 116 and carrier 118 are output members. The planetary set 20 merely idles and carries no load.

To establish third gear forward, the brake 98 is disengaged while the brake 76 is engaged and the clutch 40 remains engaged thus providing a simple planetary reduction in planetary gear set 18 between the input shaft 34 and the output shaft 144. The ring gear 134 is also the input member in third gear forward and the carrier 118 is the output member.

To establish fourth gear forward, the brake 76 is disengaged while the clutch 42 is engaged and the clutch 40 remains engaged. With both clutches 40 and 42 engaged, the planetary sets 16, 18 and 20 are in a lockup or one-to-one condition thus providing a direct drive from the input shaft 34 to the output shaft 144.

To establish one reverse ratio, the clutch 42 is engaged and the brake 146 is engaged. This provides a compound reverse reduction ratio in planetary gear sets 18 and 20 between the input shaft 34 and the output shaft 144. In this reverse drive, the sun gear 110 is the input member and the carrier 120 is the output member for the planetary gear sets.

To establish another reverse ratio, the brake 146 is disengaged while the brake 98 is engaged and the clutch 42 remains engaged. This establishes a simple planetary reverse reduction drive in planetary gear set 16 between the input shaft 34 and the output shaft 144. In this drive, the sun gear 108 is the input member and the ring gear 116 is the output member of the planetary gear set.

This transmission structure facilitates manual or automatic assembly of the transmission. The piston or movable actuator member 82 is preassembled with the springs 88 and retainer plate 87 and secured by fastener 89. This preassembly is made by inserting springs 88 in the spring pockets 85 which hold the springs in place. Then the retainer plate is placed in position to be moved between the annuluses 79 and 81 with the ears 87'' in the gaps in outer annulus 81 by aligning holes 87a with posts 83 and moving the retainer plate toward the piston and compressing the springs until the retainer plate is below the actuator faces. Then the fastener is placed on the post to hold the preassembly together with the springs having the desired degree of precompression and ready to move or be further compressed in the actuating stroke when assembled with the cylinder or fixed actuating member. Then this piston preassembly is placed in the cylinder until the piston bottoms on the cylinder at stop portions 82' on the piston and cylinder and the ears 87'' on the retainer plate partially enter the groove 84' at the free end of the annular wall of cylinder 86 to hold the piston in the fully retracted position of its operating stroke. Then piston 126, springs 130 and retainer plate 133 are similarly assembled and inserted in cylinder 128.

Then the transmission parts are assembled through the front open end of housing 10. The piston 152, which may be an assembly like piston 82 is inserted in chamber 154 and the plates 148,150 and backing member are placed in the rear splines and secured by a snap ring. Then the gear unit is assembled in position. Then the backing plate 125 is placed on splines 123 against stop shoulder 123S and plates 122—124 are placed on these splines against the backing plate. The snap ring 93 is then inserted. The preassembled web 84 and pistons 82 and 126 are then inserted with the ears of retainer plate 133 engaging ring 93. The wedge snap ring 91 is inserted and engages the web and retains the ears of retainer plate 87 so both retainer plates are retained with a small clearance in the grooves in the web. This movement of the retainer plates toward each other by the wedge snap ring compresses the retraction springs a small additional amount to provide a small clearance between the fasteners and the retainer rings to relieve the load on the fasteners 89 when they are thus assembled in the housing. Note that the wedge snap ring 91 has a bottom clearance so regardless of tolerance variations, it seats on and holds the web against ring 93. The web seats in a pilot bore through which the recesses 223 extend and is secured against rotation by fittings 94'. The friction plates 78, 80 and backing plate 75 are then assembled in the splines and located by snap ring 77. Then the clutch assemblies 42 and 38 are inserted in the housing.

Each of spline recesses 90, 123 and 151 are short axially draftable splines which have a small minimum draft. The long draft of access recess 223 for the rear spline is merely an access recess and has as large a draft as desired. The rear splines are short and at a smaller diameter. Thus rear splines, central splines and front splines with a pilot diameter between the central and front splines may be cast with an axially draftable core.

It should be understood that the above description is of an exemplary embodiment and that obvious modifications will occur to those skilled in the art.

What is claimed is:

1. In a fluid actuator device; movable actuator means having wall means having a fluid confining face facing in one axial direction, a spring seat facing in the opposite direction and a partial actuator portion extending from said wall means in said opposite direction and having an actuator face for applying a force in said opposite direction spaced a substantial axial distance from said spring seat; retainer means laterally spaced from said partial actuator portion, axially located between said actuator face and said spring seat for permitting relative movement through a distance and having a spring abutment portion facing said spring seat; a spring positioned between said spring seat and said spring abutment portion and attachable fastening means on said actuator means and retainer means to limit separating movement of said retainer means from said movable actuator means to hold said spring in said position between said actuator face and spring seat and permitting relative movement of said retainer means and movable actuator means toward each other during compression of said spring.

2. The invention defined in claim 1 and fixed actuator means cooperating with said wall means of said movable actuator means for forming an expansible chamber therebetween contracting on movement of said movable actuator means in said one direction and expanding on movement of said movable actuator means in said opposite direction; securing positioning means on said fixed actuator means for engaging said retainer means; stop means on said fixed actuator means and movable actuator means to stop said contracting movement at the fully contracted position with said fastening means limiting separating movement of said movable actuator means and said retainer means spaced a small distance from said securing positioning means.

3. The invention defined in claim 2 and detachable fastening means operably connected between said fixed actuator means and said retainer means for securing said retainer means against said securing positioning means to position said retainer means for a slight further compression of said spring relieving the load on said attachable fastening means and providing for further compression of said spring during said expanding movement on the application of said movable actuator.

4. The invention defined in claim 3 and a transmission housing having an axial abutment; said fixed actuator means being rotatably fixed to said housing and engaging said axial abutment to limit movement in said one direction; said detachable fastening means being fixed to said housing to hold said retainer means against said fixed actuator means and said fixed actuator means against said axial abutment; drive means including a friction device for providing a reaction for establishing a drive; and means operably connecting said friction device to said housing and limiting axial movement in said opposite direction.

5. In a fluid actuator device; movable annular actuator means having annular wall means having an annular fluid confining face facing in one axial direction, a plurality of spring seats facing in the opposite direction annularly distributed for balanced force application and an inner and outer actuator annulus with one actuator annulus having gaps therein extending axially from said wall means in the opposite direction and each having an annular actuator face for applying a force in said opposite direction spaced a substantial axial distance from said spring seats; retainer means having an annular spring abutment portion located laterally between said actuator annuluses and axially between said spring seats and said annular actuator face for relative movement; a plurality of springs trapped between said spring seats and said annular spring abutment portion and attachable fastening means to limit separating movement of said retainer means from said movable actuator means to hold said springs in place and permitting relative movement of said retainer means and movable actuator means toward each other during compression of said springs.

6. The invention defined in claim 5 and said attachable fastener means consisting of an opening in said retainer means; a post fixed to said movable actuator means extending through said opening and a fastener secured to said post and engaging said retainer means on the side opposite said springs.

7. The invention defined in claim 6 and said retainer means having anchoring ears extending through the gaps in said one actuator annulus.

8. The invention defined in claim 7 and fixed actuator means cooperating with said wall means of said movable actuator means forming an expansible chamber therebetween which contracts on movement of said movable actuator means in said one direction and expands on movement in said opposite direction and having stop means engaging said movable actuator means to stop said contracting movement of said movable actuator means at the fully contracted position and securing positioning means on said fixed actuator means slightly spaced from said ears at said fully contracted position.

9. The invention defined in claim 8 and detachable fastening means operably connected between said fixed actuator means and said retainer means ears for holding said retainer means against said securing positioning means slightly compressing said springs and removing the load on said attachable fastening means and assuming the spring load in the fully contracted position and during said expanding movement of said movable actuator further compressing said springs.

10. The invention defined in claim 9 and a transmission having a housing with an internal bore having splines with an open end and an axial abutment at the other end; drive means rotatably mounted in said housing having a reaction element having friction plates rotatable with the reaction element and fixed plates splined to said splines; said fixed actuator being located in said bore, held against rotation and engaging said axial abutment to limit movement in said one direction; a single detachable wedge locating ring compressing said springs to relieve the load on said fastening means and holding both said fixed actuator means against said axial abutment and holding said retainer means fixed with respect to said housing; said plates being positioned for engagement on one side by said actuator face for applying said friction device; a backing plate engaging said plates on the other side and securing means securing said backing plate to said housing.

11. The invention defined in claim 9 and said fixed actuator means being an annular cylinder having wall means including a transverse wall and annular sidewalls: said movable actuator means having said annular wall means and said annuluses between said annular sidewalls and said annuluses extending beyond the free ends of said annular sidewalls.

12. In a transmission a cast housing having an open end; planetary gear means rotatably mounted in said housing having a first and a second brake each operative to brake an element to establish ratio drives; each brake having a backing plate and a set of alternate friction plates having a plurality of circumferentially spaced sets of external teeth and intermediate friction plates connected to an element; said housing having a first group of sets of spline recesses spaced circumferentially a greater distance than the circumferential length of each set of spline recesses, extending axially a short distance and having minimum axial draft to substantially fit said external teeth and a second group of sets of spline recesses spaced circumferentially a greater distance than the circumferential length of each set of spline recesses, extending axially a short distance and having minimum axial draft to substantially fit said external teeth located axially further from the open end of said housing and located circumferentially between the spaced sets of said first group of spline recesses access recesses having at least as large a circumferential width as said sets of spline recesses extending axially and located between said sets of spline recesses of said first group and aligned with said sets of spline recesses of said second group; said second set of alternate friction plates being movable through said access recesses and positioned with said external teeth in said second group of spline recesses; said first set of alternate friction plates being positioned with said external teeth in said first group of spline recesses; means to limit axial movement of said backing plates and means to provide an apply force acting on said friction plates to engage said brakes.

13. The invention defined in claim 12 and said backing plates and alternate friction plates having identical sets of external teeth.

14. The invention defined in claim 13 and said first and second groups of spline recesses being spaced apart to provide a pilot bore traversed by said access recesses and said means to provide an apply force being a member piloted in said pilot bore, secured against movement and having opposed cylinders with a piston in each of said cylinders and each piston having an apply portion for engaging the adjacent friction plate.

15. The invention defined in claim 14 and said access recess having a large draft.

16. The invention defined in claim 14 and a retainer ring extending between each of said pistons and the adjacent friction plate and engaging an adjacent portion of said member; spring means between each retainer ring and the adjacent piston; retainer means to axially position said member and said retainer rings with said springs means compressed and biasing said pistons to the retracted position and one way limit fastener means on each piston engaging the adjacent retainer ring permitting free apply movement of said piston relative to said adjacent retainer ring and preventing movement of said retainer ring away from said piston on release of said retainer means to hold said spring means partially compressed.